W. H. BRISTOL AND M. J. JOHNSON.
REMOTE CONTROL SYSTEM.
APPLICATION FILED MAR. 18, 1919.
1,431,627.
Patented Oct. 10, 1922.
2 SHEETS—SHEET 2.
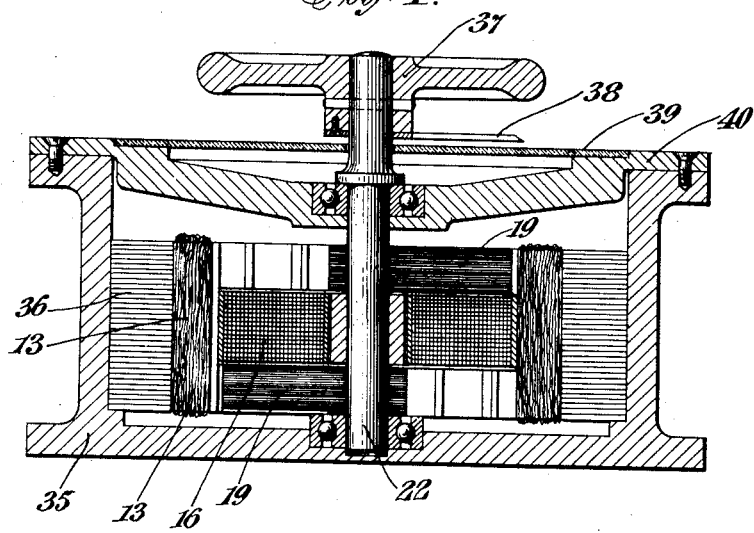
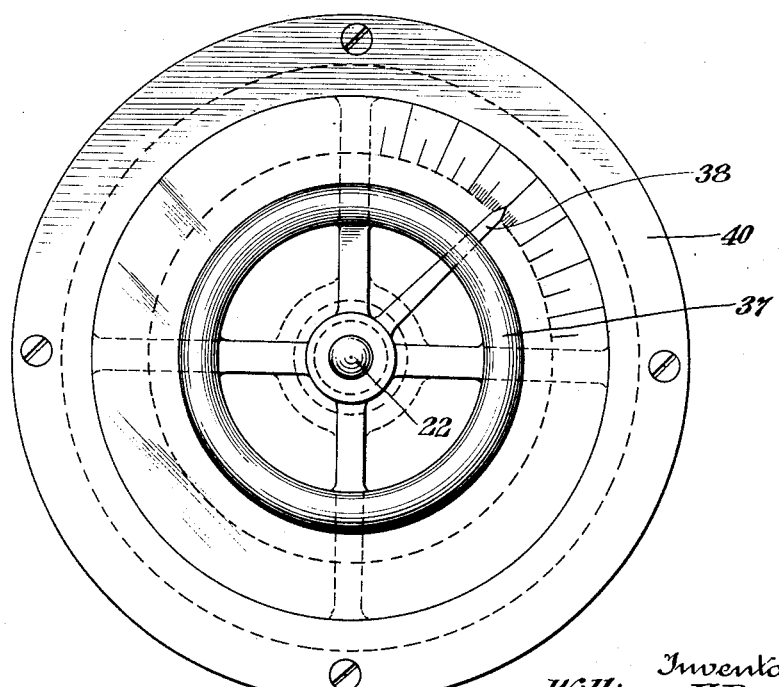
Inventors
William H. Bristol
Manfred J. Johnson
By
Attorney Patented Oct. 10, 1922.

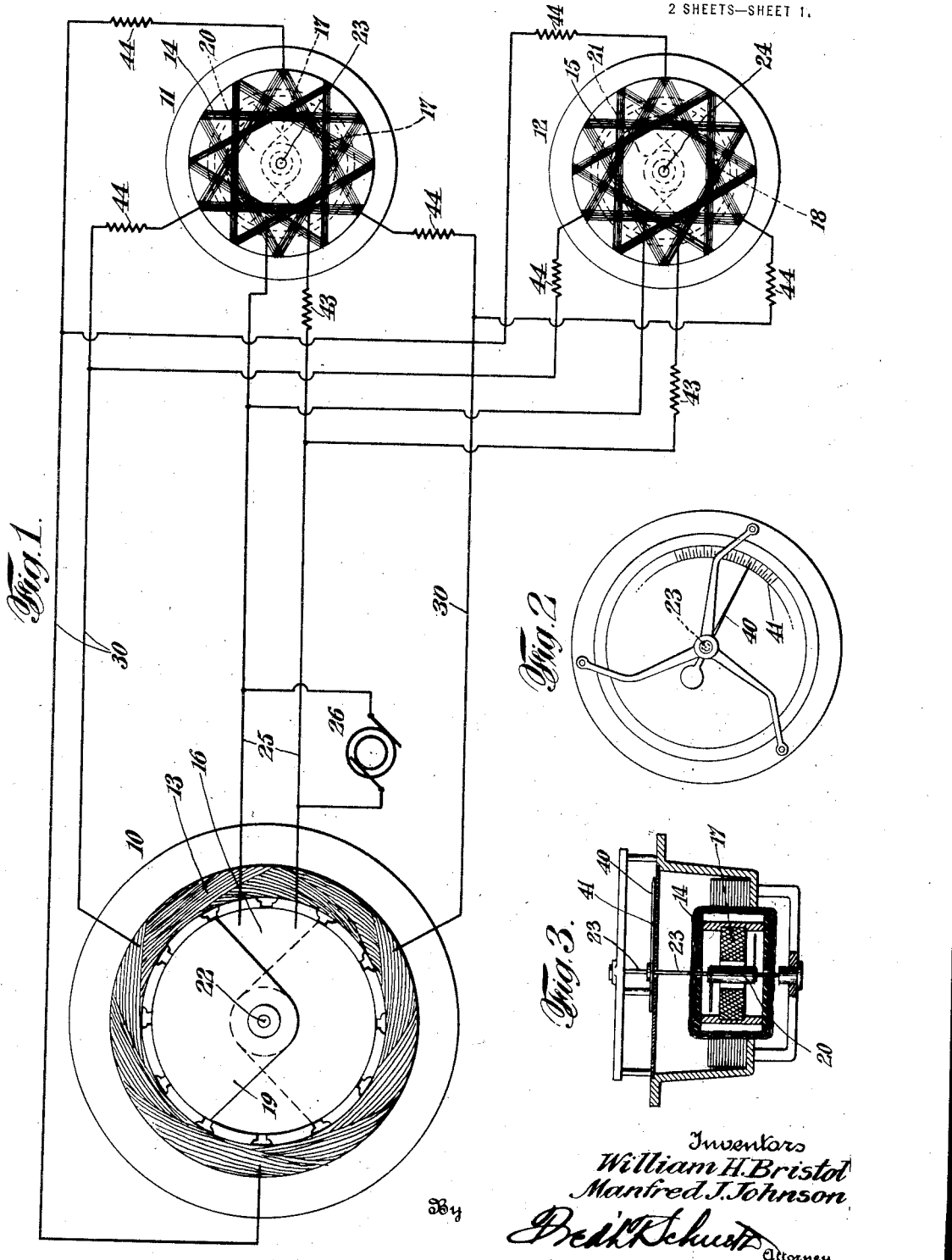

1,431,627

UNITED STATES PATENT OFFICE.

WILLIAM H. BRISTOL, OF WATERBURY, AND MANFRED J. JOHNSON, OF NAUGATUCK, CONNECTICUT, ASSIGNORS TO THE BRISTOL COMPANY, OF WATERBURY, CONNECTICUT, A CORPORATION OF CONNECTICUT.

REMOTE CONTROL SYSTEM.

Application filed March 18, 1919. Serial No. 283,361.

*To all whom it may concern:*

Be it known that we, WILLIAM H. BRISTOL and MANFRED J. JOHNSON, citizens of the United States, and residents of Waterbury and Naugatuck, respectively, in the county of New Haven and State of Connecticut, have invented certain new and useful Improvements in Remote Control Systems, of which the following is a specification.

The invention relates to a remote control system or position indicator or recorder, and embodying a transmitter member and one or more receiver members in electrical connection with one another.

It has for its object precision apparatus suitable for use in systems of this character and which shall be simple in construction and positive and accurate in operation. The apparatus is so constructed, furthermore, as to be without any moving coils and sliding or make and break contacts. In order to insure accurate and reliable indications or records in a system of this character, sensitive instruments of precision are employed as receiver members, and the same are so constructed and so arranged with reference to the transmitter member that the latter will not be affected by the former, but only vice versa. Heretofore, it has not been practicable to associate a plurality of receiver members with a single transmitter, as the receiver unit absorbed substantially all of the power resulting from movement of the transmitter, whereas with the proposed arrangement, it is possible to satisfactorily control many receivers from a single transmitter.

The nature of the invention will be best understood when described in connection with the accompanying drawings, in which—

Fig. 1 illustrates, diagrammatically, the transmitter member with a plurality of receiver members controlled thereby, and the intermediate electrical connections therefor.

Fig. 2 is a plan of one type of receiver instrument; and Fig. 3 is a vertical section therethrough.

Fig. 4 is a vertical section through one form of transmitter member; and Fig. 5 is a plan thereof.

Similar characters of reference designate corresponding parts throughout the several views.

The general type of control apparatus employed may be similar to that shown in a prior Patent No. 1,234,127, granted to me the 24th day of July, 1916, and wherein alternating current prevailing in the rotor of the transmitter will induce currents in the three wires of the stator, the relative values of which currents depend upon the position of the field or rotor. Said currents, in turn, produce a magnetic flux in the receiver to cause its rotor to be drawn into the same angular position as the field of the transmitter and which said rotor will thus revolve in accordance with the rotation of its stator field. The stator coils are thus energized entirely by induction from the rotor, and movement of the latter produces a field in the stator which polarizes it in the direction of the rotor axis and induces voltage in the stator coils, the same being transmitted to the receiver stator coils and duplicating in them the same polarity and voltage conditions, but in reverse direction, or vice versa according to the arrangement of the stator connections. The rotor of the receiver, in turn, being energized in the same direction as that of the transmitter, is reacted upon by the polarized stator until their magnetic axes coincide. Any difference in the position of the transmitter and the receiver rotors causes a difference of potential between them with a consequent flow of current and resultant torque, so that the receiver rotor will closely and smoothly follow the movement of the transmitter rotor.

To avoid the use of movable coils and sliding or make and break contacts, and to dispense with bearing friction, this type of control apparatus has been somewhat modified in the present embodiment, as shown in the drawings, in that the rotating field is produced through the medium of a rotatable soft iron armature member traversed by a magnetic flux produced by a stationary magnetizing coil. For example, the transmitter 10 and the receivers 11 and 12 have both sets of windings 13, 14, 15 and 16, 17, 18 stationary. The movable portion in this form is constituted by an armature or rotor member 19, 20 and 21 consisting of soft iron segmental members diametrically arranged upon opposite sides of the fixed coil 16, 17 or 18 upon a shaft 22, 23 or 24. Rotation of these segments, with reference to the intermediate coil 16, 17 or 18, will produce a field in the stator, as in the type hereinbefore described, and result, in the present embodiment when the transmitter rotor is moved, in corresponding movement of the segments of the other connected instrument or instruments. The electrical connections are made through leads 25 from a source of alternating current 26 to the energizing transmitter coil 16 and to the receiver coil 17, the two said coils being in multiple with the source of alternating current. Where a multiplicity of receiving devices is employed, as indicated in the drawings, the additional devices are included in parallel with the aforesaid receiving instrument, the connections therefor being indicated in the drawings and well understood. The coil 13 of the transmitting member is for the particular phase relationship, herein shown by way of example as a three-phase winding, tapped 120 degrees apart, and through leads 30 connected to corresponding points of the winding of the receiving member or members.

The transmitting member is shown more in detail in Fig. 4, and may consist of a suitable supporting base or the like 35 within which is mounted a laminated internally slotted ring 36 of soft iron, retaining the coil 13 which has a distributed three-phase winding and surrounds and holds the magnetizing coil 16. Upon opposite sides of the latter is mounted, upon the centrally disposed shaft 22, the segmental laminated soft iron members 19 and which constitute the revolving portion of the apparatus, rotating freely with the said shaft 22. Rotation may be imparted to this shaft in any desired manner, for example by means of the hand wheel 37 which carries, also, a measuring instrumentality as a pointer or indicator member 38 designed to rotate over a graduated plate or the like 39 held in the closing top or cover 40 of the casing. In this manner, a substantial and well-protected instrument is provided for the transmitter portion of the system.

The receiver members, Figs. 2 and 3, on the contrary, are delicately constructed to precisely indicate or record the movements of the pointer 38, being devised more or less similarly to the transmitter 10 but having the shaft 23 sensitively mounted. An indicating or recording arm or pointer 40 movable with said shaft is provided and moves over a suitably graduated plate 41. The windings, though the same in principle as those of the transmitter, are applied somewhat differently and insure a smooth operation. It will be noted, and as is shown and herein described, that the receiver members are smaller and arranged to be of less inertia than the transmitter member, and it is the purpose of the invention that the former shall be so constructed and arranged, whether as to actual size or particular manner of winding, that any equalizing current which might be developed by an independent movement of its shaft would be so weak as to be unable to effect the corresponding movement of the shaft of the transmitter member 10 or other receiver coupled thereto. To this end, the mass of iron of the rotatable armature member 20 is made considerably less than that of the transmitter member 10, and is shown merely as two oppositely disposed segmental disks. The equalizing current generated by the receiver member will, therefore, be so slight as to be unable to overcome the inertia and friction of bearings of the transmitter member to effect a rotation thereof, but will be particularly sensitive to the equalizing currents developed by the said transmitter member. Furthermore, the shaft 23 thereof is delicately mounted as aforesaid, for example in jewel bearings 42; and the resistance of the windings, including any external resistance, such as the resistance 43, is such that only a slight magnetizing current, say one-tenth of an ampere, flows through the magnetizing coil 17, whereas the current in the magnetizing coil 16 of the transmitter member would be approximately sixty times as great. The same applies to the windings 13 and 14, only about one-tenth of an ampere flowing through the latter and about two and eight-tenths amperes through the former, suitable resistances 44 being introduced in the receiver field circuit. Thus, the transmitter, in the particular arrangement set forth, would be capable of operating simultaneously approximately twenty-five receivers, which, themselves, are unable to affect the said transmitter member or each other, but will respond most accurately and rapidly to movement of said transmitter. This is impossible with the former embodiments, where substantially all of the power resulting from movement of the one was absorbed by the other.

Heretofore, these instruments have been constructed to be reciprocably operative, resulting in inaccuracies of indications where the one was intended to transmit accurately a particular position of the measuring instrumentality of the other, for example in the transmission of observations taken at more or less remote stations, such as in the crow's nest of a vessel to the turret, and to the gun or other positions, or in the operation of a plurality of search lights. In transmitting intelligence of this character, it is essential that the same be precisely transmitted; and it has been found that by thus constructing and arranging the receiver members to render them ineffective with respect to action upon the transmitter member, motion of the latter is most accurately and precisely transmitted to the former. Not only this, but the receiver member becomes most sensitive in responding to the movement of the transmitter member and there is no back lash or lag, so that an exact correspondence is insured.

We claim:

In a single phase alternating current synchronized remote control system; an instrument of precision including a single transmitter member connected with a source of alternating current, a measuring instrumentality movable with the transmitter member and capable of complete rotation, and a plurality of receiver apparatus in electrical connection with the transmitter member, the transmitter and receiver apparatus each including a rotatable portion operating in synchronism and that of a receiver apparatus consisting of a relatively small mass of iron delicately mounted, while that of the transmitter member consists of a relatively large mass of iron, whereby the receiver member is ineffective to produce movement of the transmitter member, and measuring instrumentalities for the receiver apparatus and controlled by the movement of the rotatable portion thereof.

Signed at Waterbury, in the county of New Haven and State of Connecticut, this 13th day of March, A. D. 1919.

WILLIAM H. BRISTOL.
MANFRED J. JOHNSON.

Witnesses:
SAMUEL A. BRISTOL,
J. P. MUIR.